(12) United States Patent
Patel et al.

(10) Patent No.: US 12,400,103 B2
(45) Date of Patent: Aug. 26, 2025

(54) VARIABLE QUANTIZATION FOR NEURAL NETWORKS

(71) Applicant: QUALCOMM Incorporated, San Diego, CA (US)

(72) Inventors: Chirag Sureshbhai Patel, San Diego, CA (US); Tijmen Pieter Frederik Blankevoort, Amsterdam (NL); Jonathan Dewitt Wolfe, Austin, TX (US); Erich Plondke, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1180 days.

(21) Appl. No.: 17/194,158

(22) Filed: Mar. 5, 2021

(65) Prior Publication Data

US 2022/0284260 A1 Sep. 8, 2022

(51) Int. Cl.
 *G06N 3/04* (2023.01)
 *G06N 3/10* (2006.01)

(52) U.S. Cl.
 CPC ............... *G06N 3/04* (2013.01); *G06N 3/10* (2013.01)

(58) Field of Classification Search
 CPC .................................... G06N 3/04; G06N 3/10
 See application file for complete search history.

(56) References Cited

U.S. PATENT DOCUMENTS

| | | | | |
|---|---|---|---|---|
| 11,861,492 B1* | 1/2024 | Hsu | ....................... | G06N 3/0495 |
| 2014/0380466 A1* | 12/2014 | Schultz | ............... | H04L 63/1408 |
| | | | | 726/22 |
| 2016/0073271 A1* | 3/2016 | Schultz | ............... | H04W 64/003 |
| | | | | 455/410 |
| 2019/0012559 A1* | 1/2019 | Desappan | ............ | G06V 10/764 |
| 2019/0050733 A1* | 2/2019 | Bopardikar | .......... | G06V 40/172 |
| 2019/0340499 A1* | 11/2019 | Burger | .................... | G06N 3/084 |
| 2020/0125947 A1* | 4/2020 | Park | ........................ | G06N 3/063 |
| 2020/0210830 A1* | 7/2020 | Shen | .......................... | G06N 3/04 |
| 2021/0073635 A1* | 3/2021 | Sasagawa | ........... | G06F 18/2451 |
| 2021/0150334 A1* | 5/2021 | Wolfe | ....................... | G06F 17/14 |
| 2022/0027126 A1* | 1/2022 | Cao | ............................ | G06F 5/01 |
| 2022/0092384 A1* | 3/2022 | Kim | ........................ | G06N 3/045 |

OTHER PUBLICATIONS

Hubara et al., "Quantized Neural Networks: Training Neural Networks with Low Precision Weights and Activation," arXiv: 1609.07061v1, Sep. 22, 2016, 29 pgs. (Year: 2016).*
Zhu et al., "Trained Ternary Quantization," arXiv:1612.01064v3, Feb. 23, 2017, 10 pgs. (Year: 2017).*
Jacob et al., "Quantization and Training of Neural Networks for Efficient Inter-Arithmetic-Only Inference," 2018 IEEE Conference on Computer Vision and Pattern Recognition, 2018, pp. 2704-2713 (Year: 2018).*

(Continued)

*Primary Examiner* — Eric J. Bycer
(74) *Attorney, Agent, or Firm* — Seyfarth Shaw LLP

(57) ABSTRACT

A method for an artificial neural network includes receiving an input. A quantization threshold is determined based on the input, or a characteristic or type of the input. Neural network values, such as weights or activations, of one or more layers of the artificial neural network are quantized according to the quantization threshold. The artificial neural network generates an output based on the quantized neural network values.

30 Claims, 8 Drawing Sheets

(56) References Cited

OTHER PUBLICATIONS

Xu et al., "DNQ: Dynamic Netowrk Quantization," arXiv:1812.02375v1, Dec. 6, 2018, 10 pgs. (Year: 2018).*
O'Connor et al., "Sigma-Delta Quantized Networks," published Nov. 10, 2016, 13 pgs. (Year: 2016).*
Zhou et al., "Balanced Quantization: An Effective and Efficient Approach to Quantized Neural Networks," published Jun. 22, 2017, 34 pgs. (Year: 2017).*
Athar, Ali, "An Overview of Datatype Quantization Techniques for Convolutional Neural Networks," published Aug. 22, 2018, 4 pgs. (Year: 2018).*
Ando et al., "Dither NN: An Accurate Neural Network with Dithering for Low Bit-Precision Hardware," 2018 International Conference on Field-Programmable Technology, pp. 9-16. (Year: 2018).*

\* cited by examiner

VARIABLE QUANTIZATION FOR NEURAL NETWORKS

BACKGROUND

Field

Aspects of the present disclosure generally relate to neural networks, and more particularly, to quantization in an artificial neural network.

Background

Artificial neural networks may comprise interconnected groups of artificial neurons (e.g., neuron models). The artificial neural network may be a computational device or be represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks consist of operands that consume tensors and produce tensors. These operands and tensors may be floating point values. Neural networks can be used to solve complex problems. However, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

SUMMARY

In an aspect of the present disclosure, a method for an artificial neural network (ANN) is provided. The method includes receiving, by a first layer of the ANN, a set of input values. The method also includes determining a first quantization threshold based on the set of input values. Additionally, the method includes quantizing neural network values of one or more layers of the ANN according to the first quantization threshold. Further, the method generating an output based on the quantized neural network values.

In another aspect of the present disclosure, an apparatus for operating an artificial neural network (ANN) is provided. The apparatus includes a memory and one or more processors coupled to the memory. The processor(s) are configured to receive, via a first layer of the ANN, a set of input values. The processor(s) are also configured to determine a first quantization threshold based on the set of input values. In addition, the processor(s) are configured to quantize neural network values of one or more layers of the ANN according to the first quantization threshold. Further, the processor(s) are configured to generate an output based on the quantized neural network values.

In another aspect of the present disclosure, an apparatus for operating an artificial neural network (ANN) is provided. The apparatus includes means for receiving, via a first layer of the ANN, a set of input values. The apparatus also includes means for determining a first quantization threshold based on the set of input values. In addition, the apparatus includes means for quantizing neural network values of one or more layers of the ANN according to the first quantization threshold. Further, the apparatus includes means for generating an output based on the quantized neural network values.

In another aspect of the present disclosure, a non-transitory computer readable medium is provided. The computer readable medium has encoded thereon program code for operating an artificial neural network (ANN). The program code is executed by a processor and includes code to receive, via a first layer of the ANN, a set of input values. The program code also includes code to determine a first quantization threshold based on the set of input values. In addition, the program code includes code to quantize neural network values of one or more layers of the ANN according to the first quantization threshold. Furthermore, the program code includes code to generate an output based on the quantized neural network values.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
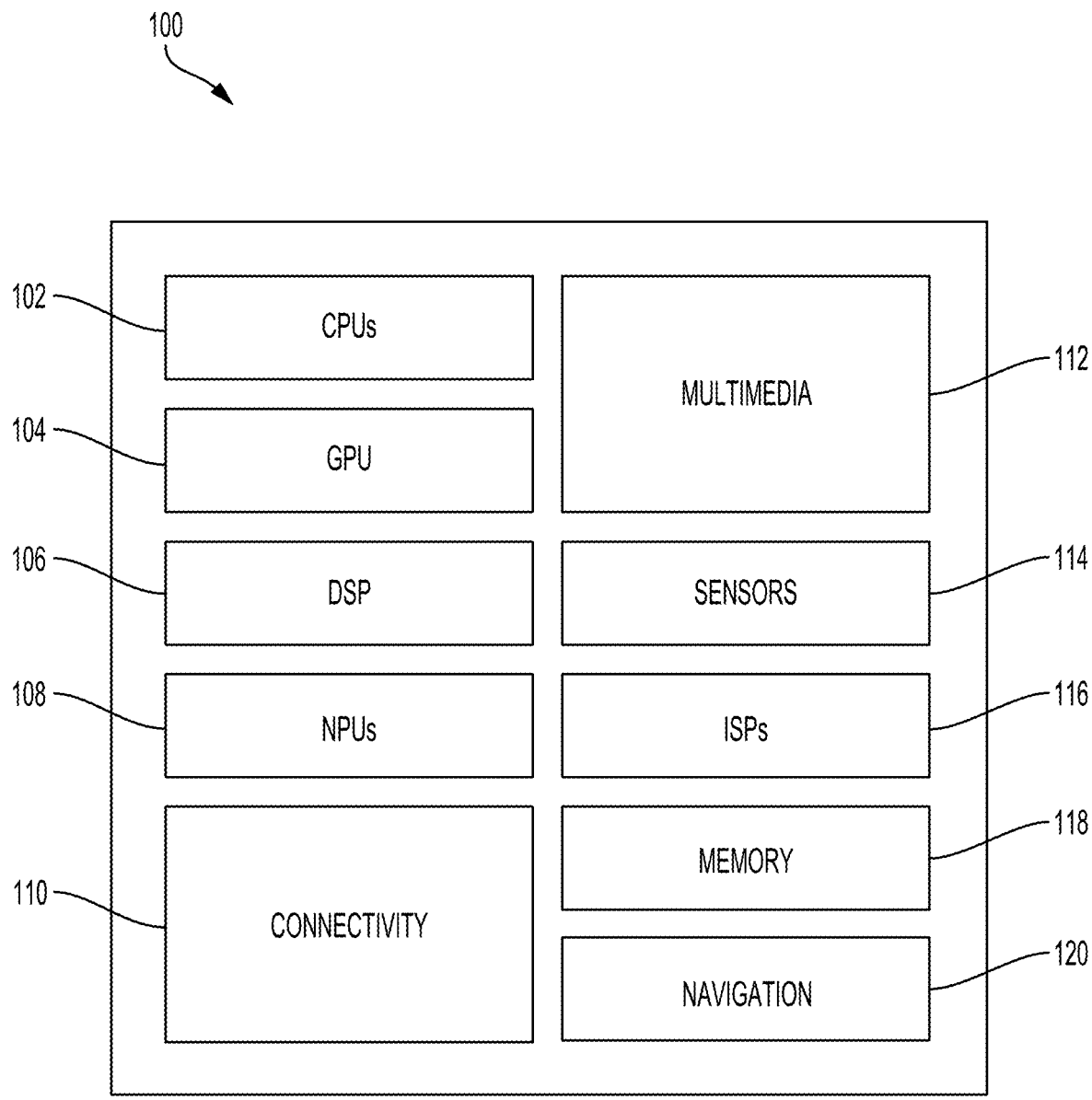
FIG. 1 illustrates an example implementation of a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Artificial neural networks may be used to solve complex problems, however, because of the network size and the number of computations that may be performed to produce the solution may be voluminous, the time for the network to complete a task may be long. This is because computations may include millions of multiplications and addition operations in which the operands, such as weights and activations, are floating point values. Furthermore, because these tasks may be performed on mobile devices, which may have limited computational power, the computational costs of deep neural networks may be problematic.

One technique for reducing the complexity and computational cost is quantization. Quantization is a conversion or approximation of input values. By applying quantization, input values from a large set may be converted to output values in a smaller set. Quantizing data in an artificial neural network may reduce memory access costs and increased computational efficiency. For example, weight values and activations may be quantized such that 32-bit floating point values may be converted to 8-bit integer values. Unfortunately, the lower-precision mathematical operations in quantized neural networks may result in less accuracy and poor performance. This is in part because many conventional techniques involve static quantization or adapt a quantization threshold initially at runtime but remain fixed thereafter for subsequent inferences.

In one illustrative example, static quantization may be applied to a transformer network. Transformer networks are popular for machine translation tasks such as text-to-speech, language translation, or other speech tasks. However, activation quantization may be problematic because the activation maximum values and minimum values can vary with time (e.g., depending on the token (word) being encoded/decoded). As such, the activation range can vary significantly. Thus, using fixed or static quantization thresholds that correspond to the maximum and minimum clipping values that define the range, may assume the worst-case range as in conventional minimum/maximum based quantization, and may adversely affect precision of other words and lead to significant loss in model performance.

To address this issue, aspects of the present disclosure are directed to dynamic or variable quantization. In some aspects, different quantization thresholds may be used for different inference instances (e.g., thresholds can vary with time). In some aspects, the quantization thresholds may be selected based on an input type or based on characteristics associated with an input. For example, quantization thresholds may be selected using different factors such as token type (e.g., end-of-sentence (EOS)/non-EOS). An end-of-sentence (EOS) token is known when performing text-to-speech or language translation tasks. As such, a higher dynamic range may be considered for a specific token and quantization thresholds may be chosen accordingly.

In another example, quantization thresholds may be selected based on the image scene type (e.g., brightness of the background, such as nighttime or daytime scene). The brightness or scene type may be obtained or determined by using techniques known in the art (e.g., analyzing pixel intensity distribution or using some neural network). Additionally, in some aspects, quantization thresholds may be selected based on previous layer activation ranges. That is, previous layer activation ranges may be used to predict the next layer activation range, such that a threshold may be adapted/determined beforehand. For instance, where a network includes two layers, the output of a first layer may be computed to determine activation ranges. The output activation ranges may be used to predict an expected output minimum/maximum for a second layer or an expected output minimum/maximum for a second layer for a particular word, for example with machine translation. The prediction may be made using statistical techniques such as regression or using a low complexity neural network, for instance.

Furthermore, in some aspects, quantization thresholds may be explicitly computed or determined using a look-table based on threshold selection criteria. Additionally, thresholds or equivalents may be used (e.g., quantization scale factor/offset).

FIG. 1 illustrates an example implementation of a system-on-a-chip (SOC) 100, which may include a central processing unit (CPU) 102 or a multi-core CPU configured for operating an artificial neural network (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive, via a first layer of an artificial neural network, a set of input values. The general-purpose processor 102 may also include code to determine a first quantization threshold based on the set of input values. Additionally, the general-purpose processor 102 may include code to quantize neural network values of one or more layers of the ANN according to the first quantization threshold. Furthermore, the general-purpose processor 102 may include code to generate an output based on the quantized neural network values.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
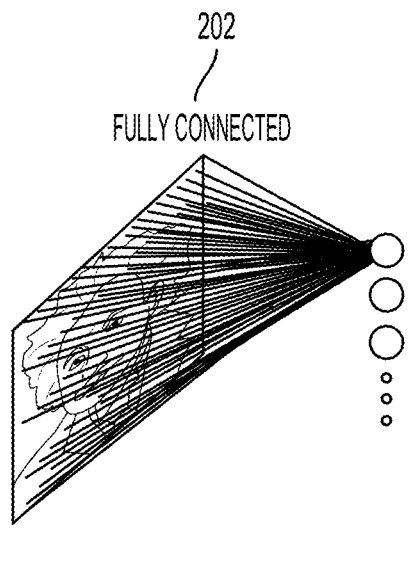
FIGS. 2A, 2B, and 2C are diagrams illustrating a neural network, in accordance with aspects of the present disclosure.
Figure 2B:
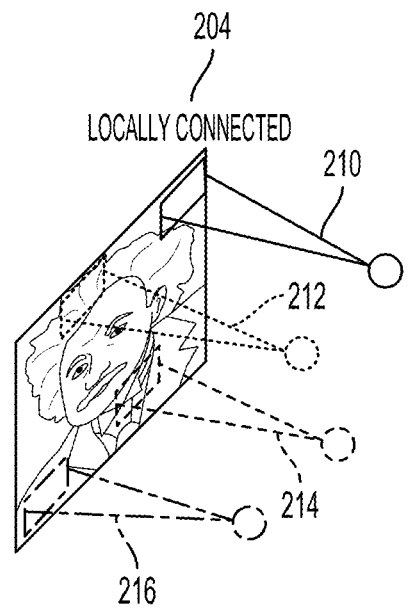

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
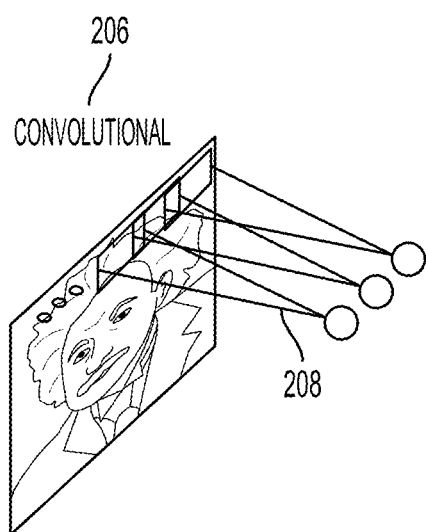

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
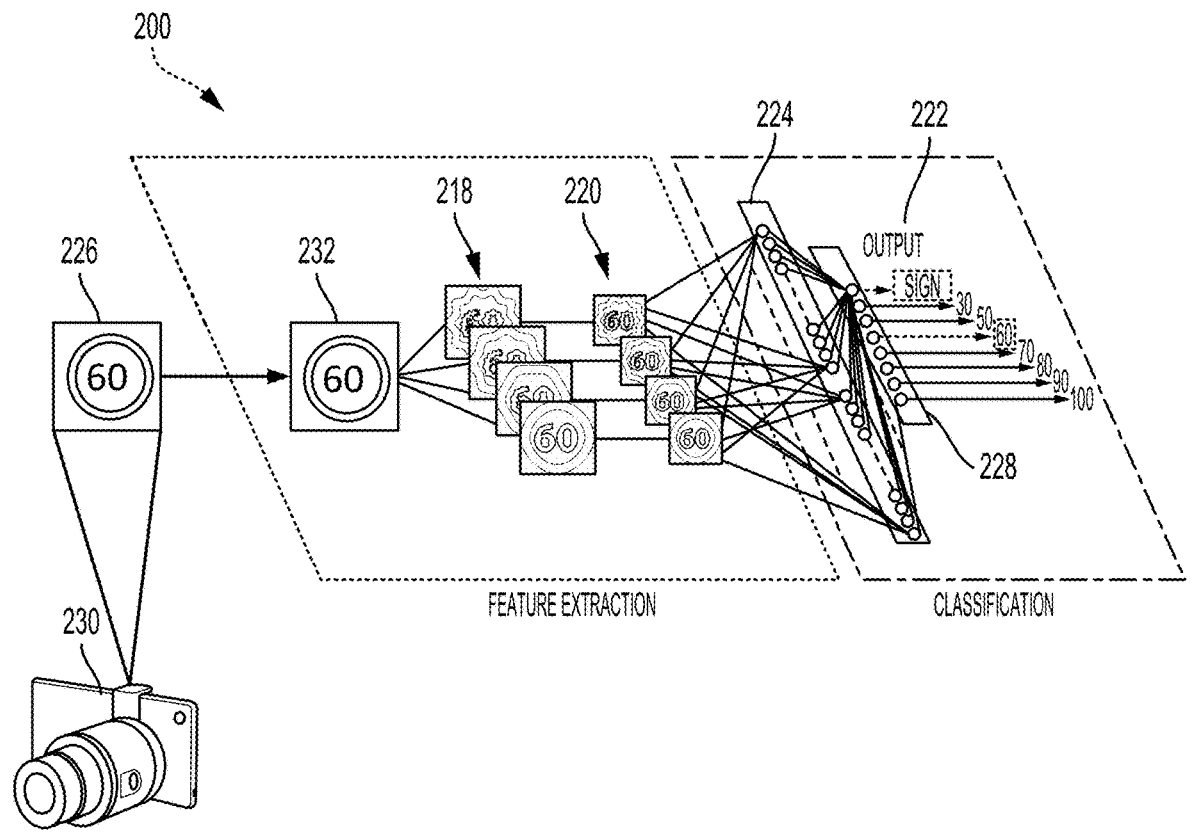
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
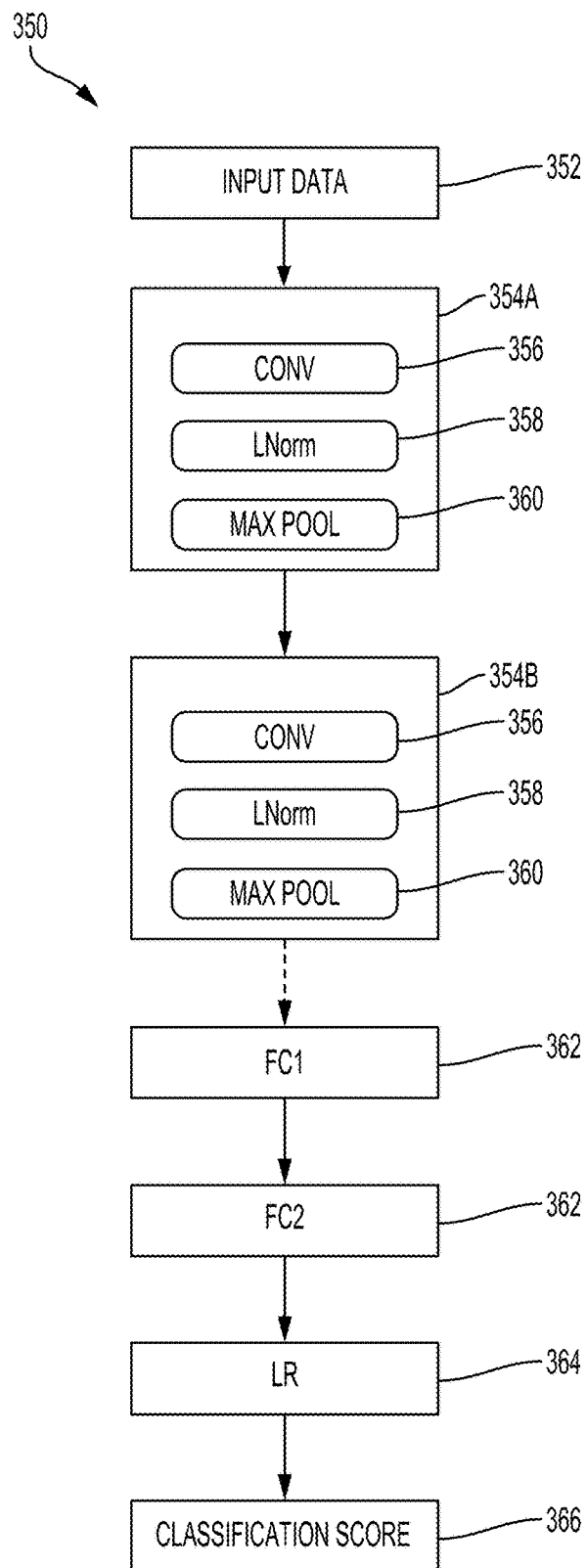
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
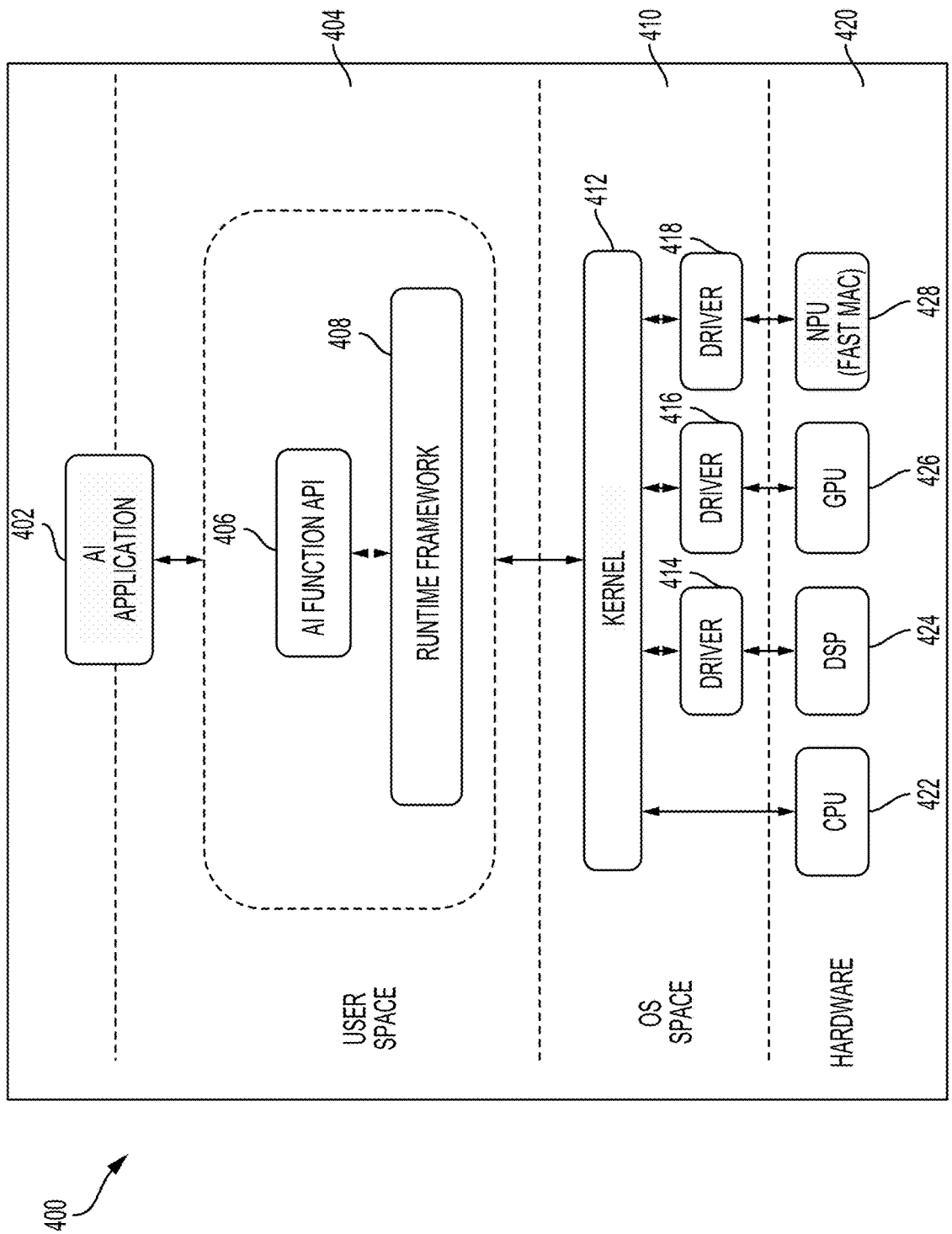
FIG. 4 is a block diagram illustrating an exemplary software architecture 400 that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as the Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428.

Figure 5A:
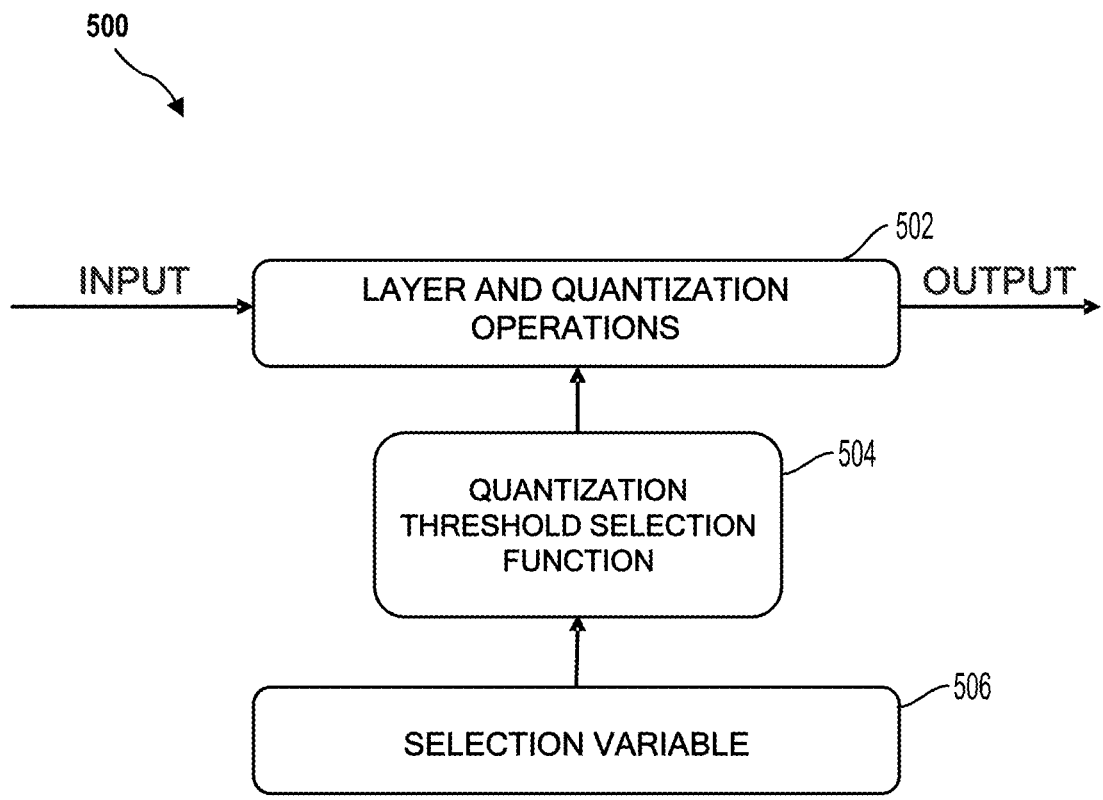
FIGS. 5A and 5B are functional block diagrams illustrating variable quantization in an artificial neural network, in accordance with aspects of the present disclosure.

FIG. 5A is a functional block diagram illustrating variable quantization in an artificial neural network 500, in accordance with aspects of the present disclosure. Referring to FIG. 5A, the artificial neural network 500 may include a layer and quantization operations block 502, a quantization threshold selection function block 504, and a selection variable block 506. The artificial neural network 500 may receive an input at the layer and quantization operations block 502. The input may, for example, include image data, speech data, a sequence, or other input.

The selection variable block 506 may select a factor or characteristic associated with the input for quantizing one or more neural network values of a layer or other portions of the artificial neural network 500. The factor or characteristic may be referred to as a selection variable. By way of example only, the selection variable may include an input type, a time associated with the input, a token type (e.g., an end-of-sentence (EOS) token or a non-EOS token,) an image scene type, brightness or image contrast, brightness of an image background (e.g., daytime or nighttime scene). Additionally, in some aspects, the selection variable may be selected based on a previous layer activation range. Furthermore, in some aspects, the selection variable may be selected based on multiple input characteristics, as well as other network metrics or parameters. The selection variable is supplied to the quantization threshold selection function block 504.

The quantization threshold selection function block 504 determines one or more quantization thresholds based on the selection variable. The quantization thresholds are values that determines how to convert the neural network values from one value to another (e.g., convert floating-point value to an integer value). In some aspects, the quantization thresholds may dynamically set the lower and upper boundaries for the quantization (output) space so as to allow the use of the same quantization framework (e.g., the 256 numbers representable by an 8-bit integer) for different ranges, thereby providing improved accuracy than fixed-threshold systems. The neural network values may, for example, include parameters (e.g., weights) or activations (e.g., intermediate layer activations or outputs).

In one example, the quantization thresholds may be selected based on an intermediate activation. That is, previous layer activation ranges may be used to predict the next layer activation range, so that a quantization threshold may be adapted/determined in advance of processing the next layer of the neural network (e.g., ANN 500). For instance, where a network includes two layers, the output of a first layer may be computed to determine activation ranges. The output activation ranges may be used to predict an expected output minimum/maximum for a second layer or an expected output minimum/maximum for the second layer for a particular word, for example with machine translation. The prediction may, for instance, be made using statistical techniques like regression or using a low complexity neural network. Predicting the activation range for a subsequent level beforehand may be particularly beneficial, providing improved performance and a more practical solution if other information such as image type or other input characteristics are not readily available in runtime.

The quantization threshold may be also adapted by applying a scale factor or an offset to an initial or predetermined quantization threshold. The scale factor or offset may be determined based on the selection variable or based directly on the input. Additionally, in some aspects, the quantization threshold may be selected from a lookup table based on the input.

The quantization threshold may be adapted for the entire network or on a layer-by-layer basis. Furthermore, the quantization threshold may be determined dynamically. For example, in some aspects, the quantization threshold may computed (e.g., by applying a scaling factor) or selected based on the selection variable or the input during runtime. The quantization threshold is, in turn, supplied to the layer and quantization operations block 502.

The layer and quantization operations block 502 applies the quantization threshold to one or more neural network values such as parameters (e.g., weights) or activations of the ANN 500. In doing so, the layer and quantization operations block 502 may quantize or convert the neural network value(s) (e.g., weights or activations) to a different value(s) (e.g., an approximation of the neural network values) to produce a quantized neural network value(s). In some aspects, the adapted quantization threshold may be applied to one or more neural network values of each layer of the ANN 500 or a subset of the ANN 500 layers. Furthermore, the quantization thresholds may be dynamically determined at runtime. Accordingly, the ANN may be operated to generate an output (e.g., an inference) based on the quantized neural network values.

Figure 5B:
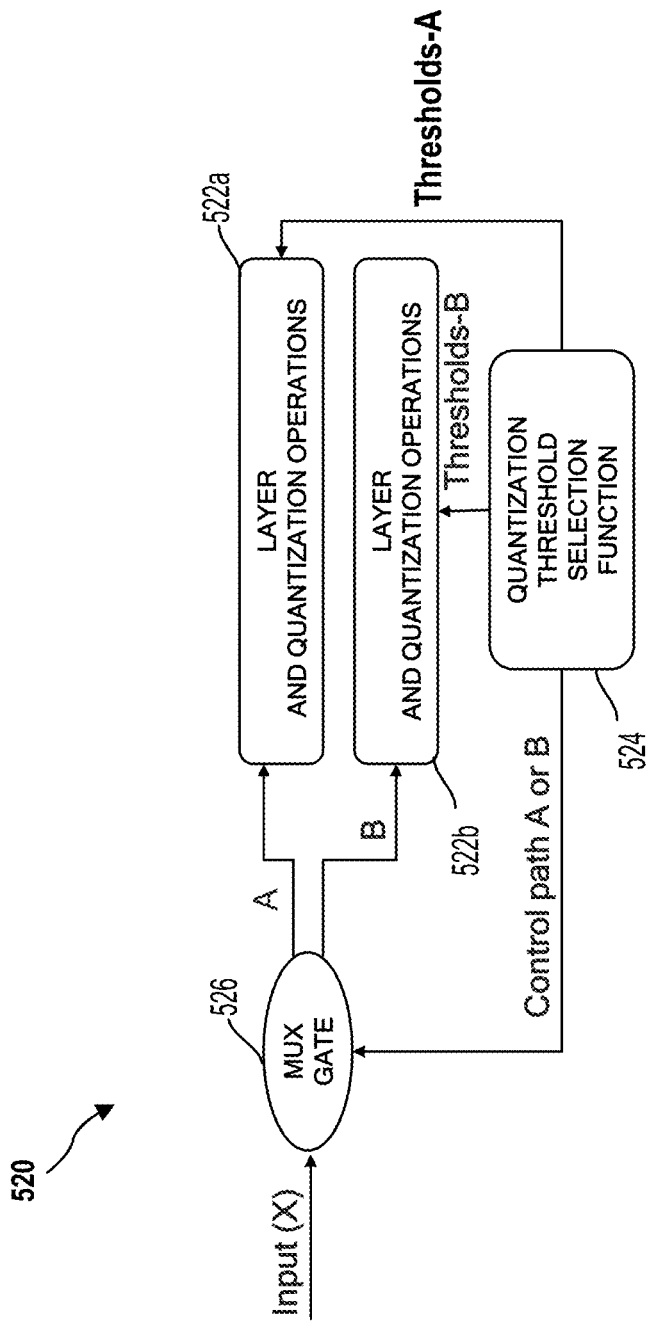

FIG. 5B is a functional block diagram illustrating variable quantization in an artificial neural network 520, in accordance with aspects of the present disclosure. Referring to FIG. 5B, the quantization thresholds may be differentially applied on a layer-by-layer basis. That is, using a multiplexor (MUX) gate 526, a quantization threshold selection function block 524 may provide a control selection, as well as a quantization threshold selection. The control selection may indicate which path, and in turn, to which layer (e.g., 522a or 522b), the selected quantization threshold (e.g., thresholds-A or thresholds-B) is to be applied. In some aspects, a layer and quantization operations block 522b may be a virtual replication of a layer and quantization operations block 522a. This may be beneficial, for example, if two different quantization levels are utilized. Although two quantization thresholds are shown in FIG. 5B, the present disclosure is not so limiting, and additional thresholds may be available for application to layers of artificial neural network 520. Additionally, in some aspects the quantization threshold may be differentially applied with a layer of the artificial neural network. For instance, in one example, threshold A may be applied to neural network weights in the layer and quantization threshold B may be applied to intermediate activations of the layer.

Depending on the quantization threshold to be applied (e.g., thresholds-A or thresholds-B), the MUX gate 526 may be controlled such that the input may be supplied to the layer (e.g., 522a) or the virtual replica of the layer (e.g., 522b). By using a virtual replica layer, storage or maintaining of the replicated layer parameters or activations may be avoided. Depending on the branch activated (e.g., path A or path B), layer parameters (e.g., weights) or activations may be read from memory for the branch selected via the MUX gate 526.

Figure 6:
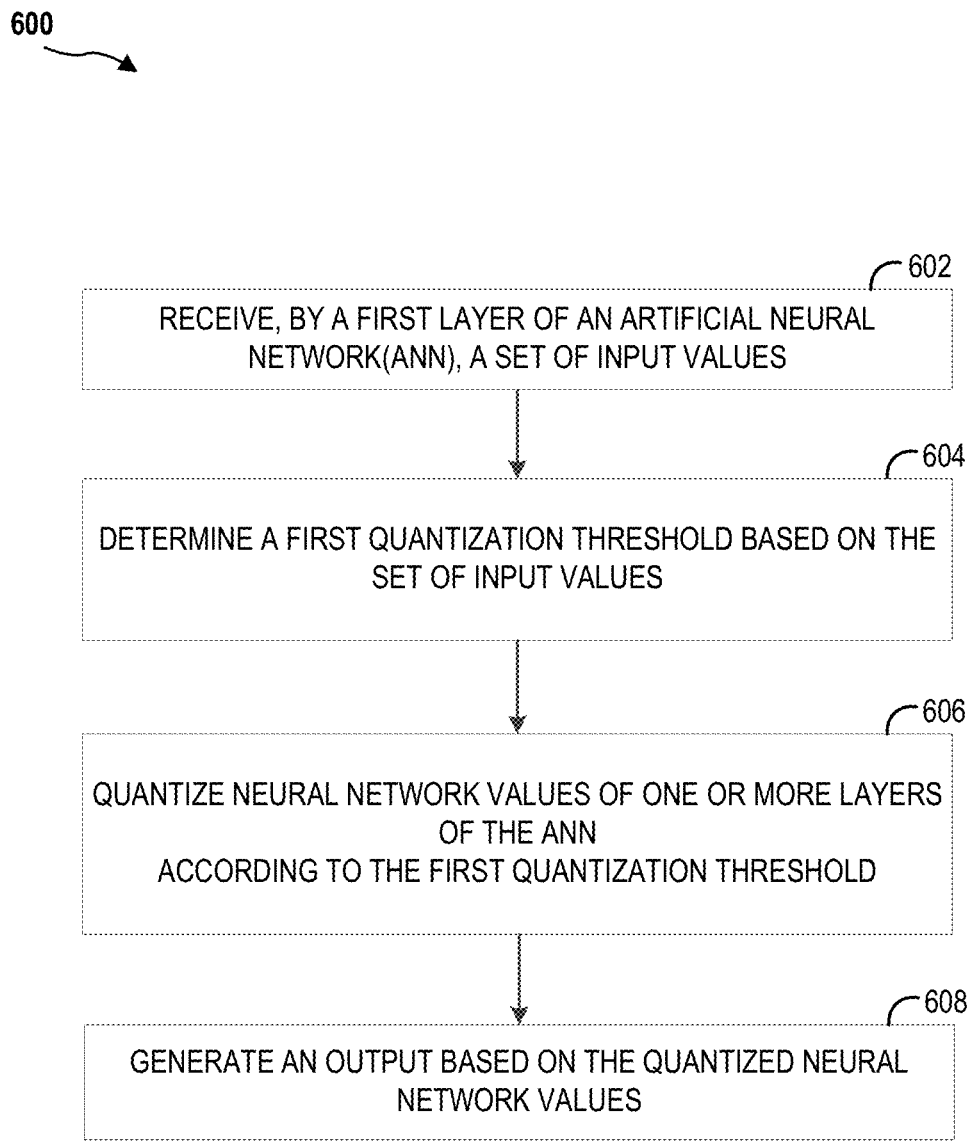
FIG. 6 illustrates a method for operating an artificial neural network, in accordance with aspects of the present disclosure.

FIG. 6 illustrates a method 600 for operating an artificial neural network (ANN), in accordance with aspects of the present disclosure. As shown in FIG. 6, at block 602, the method receives, by a first layer of the ANN, a set of input values. As described above and with reference to FIG. 5A, the artificial neural network 500 may receive an input at the layer and quantization operations block 502. For example, the input may be received at a first layer of the ANN 500. The input may, for example, include image data, speech data (e.g., an audio stream), a sequence, or other input.

At block 604, the method 600 determines a first quantization threshold based on the input. As described with reference to FIG. 5A, the quantization threshold selection function block 504 determines one or more quantization thresholds based on the selection variable (e.g., input type or characteristic). In some aspects, the quantization threshold may be adapted by applying a scale factor or an offset to an initial or predetermined quantization threshold. The scale factor or offset may be determined based on the input. Additionally, in some aspects, the quantization threshold may be selected from a lookup table based on the input. The quantization threshold may be updated or adapted during runtime. The quantization threshold may be adapted for the entire network or on a layer-by-layer basis.

At block 606, the method quantizes neural network values of one or more layers of an ANN according to the first quantization threshold. Referring to FIG. 5A, the layer and quantization operations block 502 applies the quantization threshold to neural network values of the ANN 500 to quantize or convert the neural network values to a different value (e.g., an approximation of the neural network values) to produce quantized neural network values. The neural network values may include parameters (e.g., weights) or intermediate activations, for example. The adapted quantization threshold may be applied to one or more neural network values of each layer of the ANN 500 or a subset of the ANN 500 layers. Furthermore, the adapted quantization thresholds may be dynamically determined during runtime.

At block 608, the method generates an output based on the quantized neural network values. As shown in FIG. 5A, the ANN 500 may be operated to generate an output (e.g., an inference) based on the quantized neural network values, such as a weights or activations. The output generated may relate to one or more of image processing, audio processing, or sensor-data processing, for example.

In one aspect, the receiving means, the determining means, and quantizing means, and/or the generating means may be the CPU 102, program memory associated with the CPU 102, the dedicated memory block 118, fully connected layers 362, NPU 428 and or the routing connection processing unit 216 configured to perform the functions recited. In another configuration, the aforementioned means may be any module or any apparatus configured to perform the functions recited by the aforementioned means.

Implementation examples are provided in the following numbered clauses:

1. A method for an artificial neural network (ANN), comprising:
receiving, by a first layer of the ANN, a set of input values;
determining a first quantization threshold based at least in part on the set of input values;
quantizing neural network values of one or more layers of the ANN according to the first quantization threshold; and
generating an output based on the quantized neural network values.
2. The method of clause 1, in which each of the neural network values comprises a weight or an activation.
3. The method of clause 1, further comprising:
determining a selection variable based on the set of input values; and
determining the first quantization threshold based on the selection variable.
4. The method of clause 3, in which the selection variable comprises an input type or input characteristic.
5. The method of clause 4, in which the input type comprises an end-of-sentence (EOS) token.
6. The method of clause 4, in which the input characteristic includes one or more of an image scene type, an image brightness, or an image contrast.
7. The method of clause 1, further comprising determining the first quantization threshold based on an intermediate activation.
8. The method of clause 1, in which the first quantization threshold is dynamically determined during runtime.
9. The method of any of clauses 1-8, in which the output generated by the ANN relates to at least one of image processing, audio processing, or sensor-data processing.
10. An apparatus for an artificial neural network (ANN), comprising:
a memory; and
at least one processor coupled to the memory, the at least one processor being configured:
to receive, via a first layer of the ANN, a set of input values;
to determine a first quantization threshold based at least in part on the set of input values;
to quantize neural network values of one or more layers of the ANN according to the first quantization threshold; and
to generate an output based on the quantized neural network values.
11. The apparatus of clause 10, in which each of the neural network values comprises a weight or an activation.
12. The apparatus of clause 10, in which the at least one processor is further configured:
to determine a selection variable based on the set of input values; and
to determine the first quantization threshold based on the selection variable.
13. The apparatus of clause 12, in which the selection variable comprises an input type or input characteristic.
14. The apparatus of clause 13, in which the input type comprises an end-of-sentence (EOS) token.
15. The apparatus of clause 13, in which the input characteristic includes one or more of an image scene type, an image brightness, or an image contrast.
16. The apparatus of clause 10, in which the at least one processor is further configured to determine the first quantization threshold based on an intermediate activation.
17. The apparatus of clause 10, in which the at least one processor is further configured to dynamically determined the first quantization threshold during runtime.
18. The apparatus of any of clauses 10-17, in which the output relates to at least one of image processing, audio processing, or sensor-data processing.
19. An apparatus for an artificial neural network (ANN), comprising:
means for receiving, via a first layer of the ANN, a set of input values;
means for determining a first quantization threshold based at least in part on the set of input values;
means for quantizing neural network values of one or more layers of the ANN according to the first quantization threshold; and
means for generating an output based on the quantized neural network values.
20. The apparatus of clause 19, in which each of the neural network values comprises a weight or an activation.
21. The apparatus of clause 19, further comprising:
means for determining a selection variable based on the set of input values; and
means for determining the first quantization threshold based on the selection variable.
22. The apparatus of clause 21, in which the selection variable comprises an input type or input characteristic.
23. The apparatus of clause 19, further comprising means for determining the first quantization threshold based on an intermediate activation.
24. The apparatus of any of clause 19-23, further comprising means for dynamically determining the first quantization threshold during runtime.

25. A non-transitory computer readable medium having encoded thereon program code for an artificial neural network (ANN), the program code being executed by a processor and comprising:
program code to receive, via a first layer of the ANN, a set of input values;
program code to determine a first quantization threshold based at least in part on the set of input values;
program code to quantize neural network values of one or more layers of the ANN according to the first quantization threshold; and
program code to generate an output based on the quantized neural network values.

26. The non-transitory computer readable medium of clause 25, in which each of the neural network values comprises a weight or an activation.

27. The non-transitory computer readable medium of clause 25, in which the at least one processor is further configured:
to determine a selection variable based on the set of input values; and
to determine the first quantization threshold based on one or more of the selection variable.

28. The non-transitory computer readable medium of clause 27, in which the selection variable comprises an input type or input characteristic.

29. The non-transitory computer readable medium of clause 25, further comprising program code to determine the first quantization threshold based on an intermediate activation.

30. The non-transitory computer readable medium of any of clauses 25-29, further comprising program code to dynamically determined the first quantization threshold during runtime.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method performed by one or more processors, the processor-implemented method comprising:
receiving, by a first layer of an artificial neural network (ANN), a set of input values;

determining a first quantization threshold for at least a second layer of the ANN based at least in part on a first activation range for the first layer of the ANN;

quantizing neural network values of one or more layers of the ANN according to the first quantization threshold; and generating an output based on the quantized neural network values.

2. The processor-implemented method of claim 1, in which each of the neural network values comprises a weight or an activation.

3. The processor-implemented method of claim 1, further comprising:

determining a selection variable based on the set of input values; and determining the first quantization threshold based on the selection variable.

4. The processor-implemented method of claim 3, in which the selection variable comprises an input type or an input characteristic associated with the set of input values.

5. The processor-implemented method of claim 4, in which the input type comprises an end-of-sentence (EOS) token.

6. The processor-implemented method of claim 4, in which the input characteristic includes one or more of an image scene type, an image brightness, or an image contrast.

7. The processor-implemented method of claim 1, further comprising determining a second quantization threshold for a third layer of the ANN based on a second activation range for the second layer of the ANN.

8. The processor-implemented method of claim 1, in which the first quantization threshold is dynamically determined during runtime.

9. The processor-implemented method of claim 1, in which the output generated by the ANN relates to at least one of image processing, audio processing, or sensor-data processing.

10. An apparatus for an artificial neural network (ANN), comprising:

at least one memory; and at least one processor coupled to the at least one memory, the at least one processor being configured to:

receive, via a first layer of the ANN, a set of input values;

determine a first quantization threshold for at least a second layer of the ANN based at least in part on a first activation range for the first layer of the ANN;

quantize neural network values of one or more layers of the ANN according to the first quantization threshold; and generate an output based on the quantized neural network values.

11. The apparatus of claim 10, in which each of the neural network values comprises a weight or an activation.

12. The apparatus of claim 10, in which the at least one processor is further configured to:

determine a selection variable based on the set of input values; and determine the first quantization threshold based on the selection variable.

13. The apparatus of claim 12, in which the selection variable comprises an input type or an input characteristic associated with the set of input values.

14. The apparatus of claim 13, in which the input type comprises an end-of-sentence (EOS) token.

15. The apparatus of claim 13, in which the input characteristic includes one or more of an image scene type, an image brightness, or an image contrast.

16. The apparatus of claim 10, in which the at least one processor is further configured to determine a second quantization threshold for a third layer of the ANN based on a second activation range for the second layer of the ANN.

17. The apparatus of claim 10, in which the at least one processor is further configured to dynamically determine the first quantization threshold during runtime.

18. The apparatus of claim 10, in which the output relates to at least one of image processing, audio processing, or sensor-data processing.

19. An apparatus for an artificial neural network (ANN), comprising:

means for receiving, via a first layer of the ANN, a set of input values;

means for determining a first quantization threshold for at least a second layer of the ANN based at least in part on a first activation range for the first layer of the ANN;

means for quantizing neural network values of one or more layers of the ANN according to the first quantization threshold; and means for generating an output based on the quantized neural network values.

20. The apparatus of claim 19, in which each of the neural network values comprises a weight or an activation.

21. The apparatus of claim 19, further comprising:

means for determining a selection variable based on the set of input values; and means for determining the first quantization threshold based on the selection variable.

22. The apparatus of claim 21, in which the selection variable comprises an input type or an input characteristic associated with the set of input values.

23. The apparatus of claim 19, further comprising means for determining a second quantization threshold for a third layer of the ANN based on a second activation range for the second layer of the ANN.

24. The apparatus of claim 19, further comprising means for dynamically determining the first quantization threshold during runtime.

25. A non-transitory computer readable medium having encoded thereon program code for an artificial neural network (ANN), the program code being executed by a processor and comprising:

program code to receive, via a first layer of the ANN, a set of input values;

program code to determine a first quantization threshold for at least a second layer of the ANN based at least in part on a first activation range for the first layer of the ANN;

program code to quantize neural network values of one or more layers of the ANN according to the first quantization threshold; and program code to generate an output based on the quantized neural network values.

26. The non-transitory computer readable medium of claim 25, in which each of the neural network values comprises a weight or an activation.

27. The non-transitory computer readable medium of claim 25, in which the at least one processor is further configured:

to determine a selection variable based on the set of input values; and to determine the first quantization threshold based on one or more of the selection variable.

28. The non-transitory computer readable medium of claim 27, in which the selection variable comprises an input type or an input characteristic associated with the set of input values.

29. The non-transitory computer readable medium of claim 25, further comprising program code to determine a second quantization threshold for a third layer of the ANN based on a second activation range for the second layer of the ANN.

30. The non-transitory computer readable medium of claim 25, further comprising program code to dynamically determine the first quantization threshold during runtime.

* * * * *